(12) United States Patent
Mandelli et al.

(10) Patent No.: US 8,218,552 B2
(45) Date of Patent: Jul. 10, 2012

(54) SELECTIVE RADIO TRANSMISSION OF PACKETS

(75) Inventors: Giuseppe Luigi Mandelli, Cinisello Balsamo (IT); Andrea Galbiati, Cernusco (IT); Marzio Gerosa, Seregno (IT); Giorgio Barzaghi, Grezzago (IT); Giuseppe De Blasio, Rome (IT); Gianluca Boiocchi, Osio Sotto (IT)

(73) Assignee: Alcatel Lucent, Paris (FR)

( * ) Notice: Subject to any disclaimer, the term of this patent is extended or adjusted under 35 U.S.C. 154(b) by 404 days.

(21) Appl. No.: 12/492,665

(22) Filed: Jun. 26, 2009

(65) Prior Publication Data
US 2009/0323668 A1 Dec. 31, 2009

(30) Foreign Application Priority Data
Jun. 27, 2008 (EP) ...................................... 08305349

(51) Int. Cl.
*H04L 12/56* (2006.01)
(52) U.S. Cl. ................................... 370/395.42; 370/349
(58) Field of Classification Search .................. 370/235, 370/328, 349, 395, 42, 401
See application file for complete search history.

(56) References Cited

U.S. PATENT DOCUMENTS

| | | | |
|---|---|---|---|
| 2003/0169746 A1* | 9/2003 | Kitazawa et al. | 370/395.42 |
| 2006/0233130 A1* | 10/2006 | Rajkotia | 370/328 |
| 2007/0002742 A1* | 1/2007 | Krishnaswamy et al. | 370/235 |
| 2008/0037567 A1* | 2/2008 | Cho et al. | 370/401 |

OTHER PUBLICATIONS

Tosun et al., "Dynamically Adding Redundancy for Improved Error Concealment in Packet Voice Coding," Proc. European Signal Processing Conf., XP002503296, 4 pages, (Sep. 2005).
European Search Report, Nov. 11, 2008.

* cited by examiner

*Primary Examiner* — Albert T Chou
(74) *Attorney, Agent, or Firm* — Fay Sharpe LLP

(57) ABSTRACT

A method of radio transmitting packets and transmitter. The packets are identified by at least one respective transmission criterion which is selected from either one or a combination of the following criteria:
 types of services classified in terms of reliability in transmission,
 bandwidth efficiency in transmission,
 drop ranking in transmission.
The identified packet are assigned an indicator indicative of the selected transmission criterion and are transmitted according to the transmission criterion corresponding to the indicator assigned to the packet.

28 Claims, 4 Drawing Sheets

SELECTIVE RADIO TRANSMISSION OF PACKETS

This application is based on and claims the benefit of European Patent Application No. 08305349.6 filed Jun. 27, 2008, which is incorporated herein by reference in its entirety.

FIELD OF THE INVENTION

The present invention relates to the field of wireless communication. In particular, the invention relates to transmission of packets on wireless physical layer.

BACKGROUND

In packet transmission on wireless physical layer, there are in principle, two diverging requirements which need to be met in order to obtain a desirable quality of transmission: on the one hand it is needed to make the packet transmission reliable, and on the other, to maintain a good level of bandwidth efficiency. In order to make the transmission reliable, redundancy is used. However redundancy is a factor which deteriorates efficiency. That is to say, increase in redundancy, decreases efficiency and vice-versa.

On the other hand, circuit emulation services (CES) allow for the transport of constant bit rate (CBR) flows over a microwave packet radio network. Transmission over microwave packet radio often takes advantage from adaptive coding modulation (ACM) techniques. With ACM, it is possible to use a high modulation scheme in order to have a higher radio bandwidth within a given specific radio channel and switch to low modulation schemes when there is a degradation of radio channel maintaining the radio link in operation using a lower bandwidth. Throughout this description, modulation schemes equal or below 16 QAM, including for example 4 QAM are considered low modulation schemes and modulation schemes equal or over 64 QAM, including for example 128 QAM are considered high modulation schemes.

SUMMARY

Embodiments of the invention aim at providing some balance between redundancy (reliability) and bandwidth cost (efficiency) in Packet Switched Networks (PSN) so as to make the packet transmission reliable while maintaining a high bandwidth efficiency Efforts, related to finding a right balance between redundancy (reliability) and bandwidth cost (efficiency), are known to be applied case by case; that is for every transmission, it would be needed to establish a specific balance criterion. However, establishing such balance case by case is not considered to be an optimum and/or efficient practice, and in any case, the result would be to sacrifice to some extent one factor in favor the other.

Furthermore, in transmission over microwave packet radio using adaptive coding modulation (ACM), when there is degradation of radio channel, the modulation scheme is changed to a lower level. This causes a reduction in the available radio bandwidth which may in turn give rise to a congestion at the transmission side since the original number of TDM flows cannot be carried by the radio link using the new (less) available bandwidth. In such circumstances, the packets related to CES traffic are discarded and the process of discarding affects randomly all TDM flows. At the reception side, the arriving TDM flows are therefore affected by errors. This may generate error indications such as out of synchronization, loss of signal or alarm indication signals.

In order to avoid such problems, one known solution is directed to prioritizing the TDM flows by assigning different class of services to the CES traffic. However, this solution has the drawback that the TDM flows related to the higher levels if CoS can be affected by a Packet Delay Variation not manageable by Jitter buffers at reception side, therefore causing errors or out of synchronization indications.

Accordingly in some embodiments, there is provided a method of radio transmitting packets, comprising the step of identifying packets corresponding to at least one respective transmission criterion, said transmission criterion being selected from either one or a combination of the following criteria:
  types of services classified in terms of reliability in transmission,
  bandwidth efficiency in transmission,
  drop ranking in transmission,
the method further comprising the steps of
  assigning to the identified packet, an indicator indicative of said selected transmission criterion,
  transmitting said packet according to the transmission criterion corresponding to the indicator assigned to the packet, wherein the transmission is performed with a level of redundancy as identified by said indicator, and/or the transmission is performed if the indicator in combination with a selected modulation scheme is indicative of a priority level higher than a predetermined level.

According to another specific embodiment, the modulation scheme for transmitting packets is selected from a range of schemes comprising at least a high priority level scheme and a low priority level scheme.

According to a specific embodiment, said transmission is not performed if the indicator in combination with a selected modulation scheme is indicative of a priority level higher than a predetermined level.

Furthermore, in some embodiments, there is provided a transmitter for radio transmitting packets, comprising an identifier for identifying packets corresponding to at least one respective transmission criterion, said transmission criterion being selected from either one or a combination of the following criteria:
  types of services classified in terms of reliability in transmission,
  bandwidth efficiency in transmission,
  drop ranking in transmission,
the transmitter further comprising
  assigning to the identified packet, an indicator indicative of said selected transmission criterion,
  transmitting said packet according to the transmission criterion corresponding to the indicator assigned to the packet, wherein the transmission is performed with a level of redundancy as indicated by said indicator, and/or the transmission is performed if the indicator in combination with a selected modulation scheme is indicative of a priority level higher than a predetermined level.

These and further features and advantages of the present invention are described in more detail in the following description as well as in the claims with the aid of the accompanying drawings.

EXAMPLES OF PREFERRED EMBODIMENTS

In some embodiments of the invention it is assumed that a packet service is dealt with which is sensitive to errors, the errors being such that they may cause loss of the entire packet, examples of such services are real-time or CBR services such has voice and video. In practice it may occur that packets related to one service which is sensitive to errors are mixed (interleaved) with packets related to other services which are less sensitive to errors or can stand loss of some packets to a certain extent, for example services such as FTP or downloading services.

Figure 1:
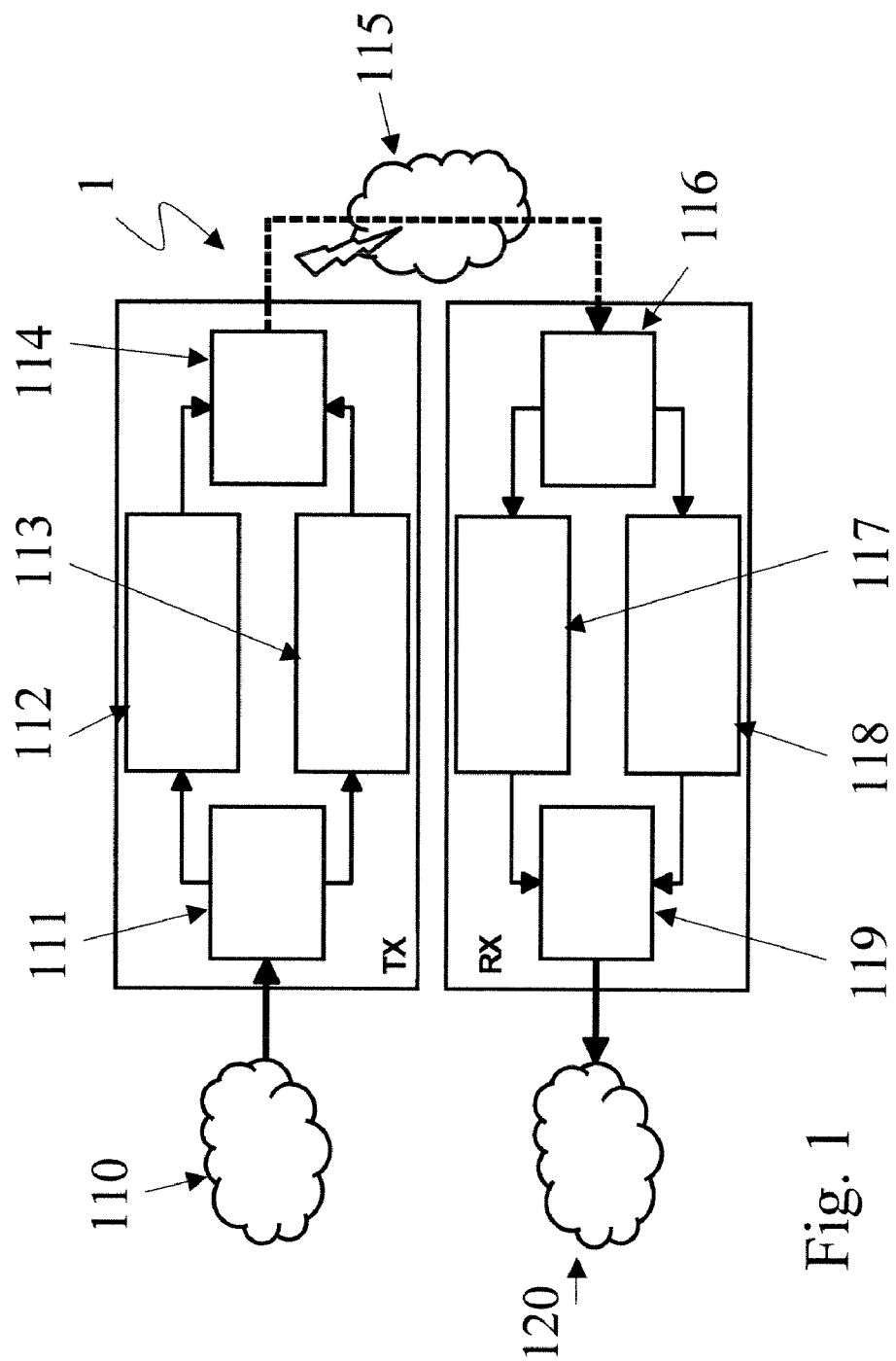
FIG. 1 is a schematic exemplary representation of a network comprising a transmitter side and a receiver side wherein embodiments of the present invention may be implemented.

In FIG. 1, there is shown a schematic representation of a network 1 wherein embodiments of the present invention may be implemented. It is assumed that a stream of interleaved packets, comprising error sensitive and non-error-sensitive packets, arrives from a packet switched network (PSN) 110 to an input of a transmitter TX. The stream of packets is input in a packet identifier 111. The patent identifier 111 is in charge of identifying packets according to predefined transmission criteria. Examples of such predefined criteria are:

According to the type of services the packets relate to. Certain packets may require a higher level of reliability in transmission than others. These packets are therefore identified, and classified, such that their transmission is performed under more reliable conditions, as will be described.

According to bandwidth efficiency in transmission.

The identification is followed by assigning an indicator to the packet which represents a criterion identified for transmission of that particular packet. This is done in the packet identifier 111.

Once the packets are identified, they are separated according to the above criteria such that packets requiring high reliability (or requiring low bandwidth efficiency) are input in a module 112 for processing such type of packets and packets requiring low reliability (or requiring high bandwidth efficiency) are input in another module 113 for processing the latter type of packets. The processing of packets may comprise applying predetermined levels of reliability in transmission to the packets. Different levels of reliability in packet transmission are obtained by applying different weights of protection redundancy to the services. Thus a heavy (high) protection redundancy is used for services that need high levels of reliability, and a light, or no protection redundancy is used for for bandwidth sensitive services (requiring low reliability). Therefore module 112 applies high redundancy to the packets that it receives at its input and module 113 applies low redundancy to the packets that it receives at its input.

Applying redundancy is performed by means of known techniques such as but not limited to repetition/majority code, Reed Solomon line coding, Binary Hamming Code, LDPC (low density parity check) code, as well as any appropriate FEC (forward error correction) code.

The packets with the corresponding level of redundancy assigned thereto are output from the respective modules 112 and 113 and input in a multiplexer (or interleaver) 114 where the two differentiated protection services are multiplexed.

The assigning of an indicator to the packet is performed by marking each time slot of the packet so as to show whether it corresponds to one service (e.g. heavily protected) or another service (e.g. lightly protected) that need to be protected against errors by means of a timeslot-type bit as identifier. The information used as identifier may be contained in only one bit, however, the identifier may occupy a byte (8 bits) as a timeslot as will be described below.

The timeslot-type bit for the heavily protected packets may be a 1 and that of the lightly protected packets may be a 0.

The protection of the timeslot-type bit (i.e. the protection of the identification code itself) can be performed by a simple 'repetition code' by means of which the same bit is transmitted various times and at the receiver side the correct bit is decided by checking which bits, 1s or 0s have been received more by such repetition (the decision is taken based on majority) but other known algorithms can also be used.

Figure 2A:
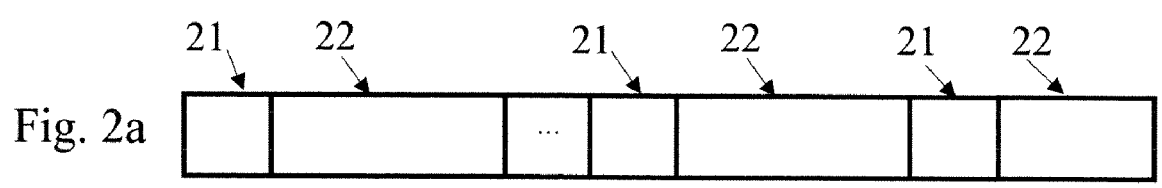
FIGS. 2a, 2b and 2c represent exemplary timeslot structures according to embodiments of the present invention.

FIG. 2a shows a simplified timeslot structure of a stream of packets for a better understanding of how the packets are identified with corresponding identifiers. As shown in the figure, each timeslot as a whole has an identifier 21 of one byte and a payload 22 of any convenient number of bytes. As mentioned above, the identifier byte may only have one bit of information or it may have the 8 bits of the byte with the same identifier information. The identifier bit information may be for example a 1 for a high reliability requirement and a 0 for a low reliability requirement.

Figure 2B:
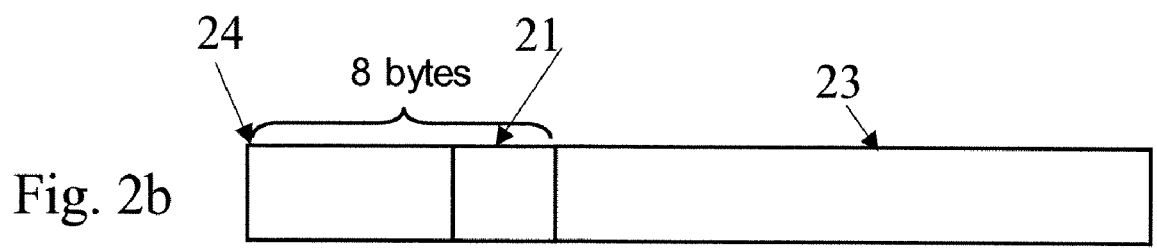
Figure 2C:
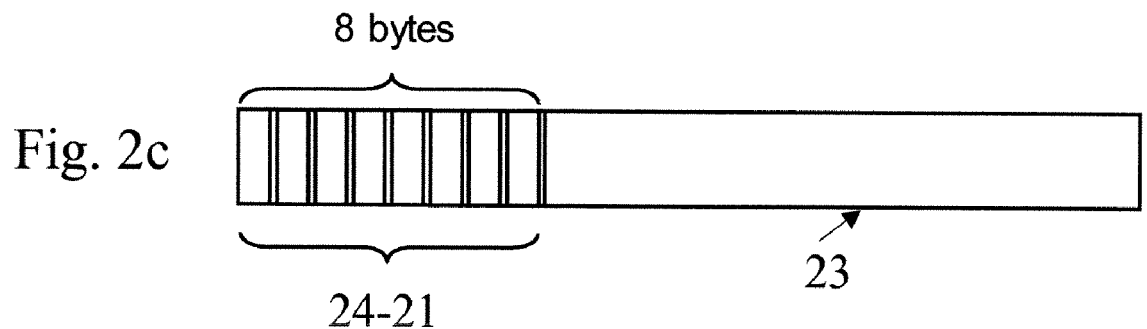

The following description in relation to FIGS. 2b and 2c, is an exemplary, non-limitative, description of how an identifier may be interleaved bit by bit into 8 different bytes, and those skilled in the art would realize that other known methods may be used within the scope of the invention.

In this example, the errors on the incoming flow of packets are distributed in a byte. This is due to the fact that conventional protection coding methods such as Reed Solomon are not capable of detecting the location of the error inside the byte.

In case other types of error distribution, different from the above (distribution in a byte) are experienced, the corresponding protection should be chosen according to that different type error distribution on a case by case basis, within the scope of the present invention.

Referring now to FIGS. 2b and 2c, an identifier having 8 bits of information may be interleaved bit by bit into 8 different bytes together with the last 7 bytes (payload) of the previous timeslot. This improves robustness in transmission.

In FIG. 2b, there is shown a timeslot structure having first payload in a timeslot of N bytes 23, an identifier byte 21 in a timeslot of 1 byte and a second payload in a time slot of 7 bytes 24, the latter timeslot 24 being a part of a larger timeslot, not shown in its totality, which precedes the identifier. As shown in the figure, the identifier timeslot 21, may have 8 bits of identifying information which are all the same. This scheme is generally known as protection by repetition.

In FIG. 2c, there is shown the same timeslot structure of FIG. 2b, with the difference that in FIG. 2c, the identifier bits of the timeslot 21 have been interleaved with the 8 different bytes, namely one byte as one identifier of the payload corresponding to the timeslot 23 and 7 remaining bytes as identifiers of the last 7 bytes corresponding to the previous timeslot 24.

Referring back to FIG. 1, next the multiplexed packets are transmitted toward the receiving side. As shown in FIG. 1, the transmission may pass through a "noisy" physical layer 115.

However, as the noise sensitive packets are transmitted with high reliability, they would not suffer from a high risk of loss.

At the receiving side RX, a packet identifier 116 receives the multiplexed packets which carry the corresponding identification, such as the timeslot-type bit, and separate the packets according to their corresponding identification.

Once the packets are identified, they are separated such that packets having an identifier indicative of high reliability (or not requiring high bandwidth efficiency) are input in a module 117 and packets having an identifier indicative of high bandwidth efficiency required (or indicative of not requiring high reliability) are input in another module 118 for processing the latter type of packets.

Modules 117 and 118 remove the identification carried by each packet and the protection redundancy inserted by modules 112 and 113 respectively. Next the packets are forwarded to a packet multiplexer 119, where they are multiplexed for further transmission to a PSN 120.

The functionalities described above in relation to packet identifiers 111 and 116, processing modules 112, 113, 117, 118 and multiplexers 114 and 119 may be implemented using FPGA or network processor properly programmed.

In some embodiments of the invention it is assumed that CBR flows are transported over a microwave packet radio network using the circuit emulation services. In order to guarantee the requirements of reducing the delay and eliminating as much as possible the jitter for these services, a high level of class of service (CoS) is desirable to be provided to the packets carrying CES traffic, for example by assigning a high level of priority queue than other services such as the so-called Best-Effort or the Variable Bit Rate.

In case there is a degradation of radio channel and the transmission is switched to a low modulation scheme, the packets related to CES traffic are discarded thus affecting the TDM flows and generating error indications at the reception side.

According to some embodiments of the invention, TDM flows are classified according to respective modulation schemes. This may be done by assigning to the TDM flow a drop ranking. A flow policer is also provided in order to control the transmission of TDM flows. The term policer is used in the related art as relating to an element (hardware, software or combination) capable of controlling the flow of traffic and allowing or not allowing said traffic based on predefined criteria. The flow policer may stop the selected microflows (examples of microflows are CES traffic related a single E1/DS1 or a E3/DS3 signal) when the modulation scheme is switched down.

The drop ranking of the TDM flows represents a microflow classification inside the CES traffic. Each packet belonging to a specific microflow is marked with a drop ranking. The drop ranking is associated to a classification of the CES microflow inside the network which is then reflected at equipment level.

Additionally, the flow policer may also allow or block the traffic based on the available channel capacity. In this manner, the flow policer fills, as much as possible the channel capacity, according to the relevant microflow classification (represented by the drop ranking). For instance, in case for any reason, a certain microflow disappears and thus a free capacity becomes available, the policer may use this new available capacity for the next (defined by the rank) microflow waiting to be transmitted, which is also defined by its corresponding drop ranking. Likewise, in case for any reason, a certain microflow, with lower drop ranking appears, the policer may drop a microflow with the higher drop ranking to make available the necessary capacity for the transmission of the lower drop ranking microflow.

Therefore, while the drop ranking of the microflow is a first criterion for allocating priority in traffic, an additional criterion based on the available capacity in the channel may be used by the policer. This allows for an optimum use of channel capacity. Thus if the channel capacity is sufficiently available, not only a microflow with a lowest drop ranking (i.e. highest priority for transmission) is given priority, but also microflows with higher drop ranking may be allowed to be transmitted according to their respective ranking from the next lower ranking (higher priority) microflow to the subsequent higher ranking (lower priority) microflows.

In a general implementation, the flow policer may be configured to combine the indicator information, namely the drop ranking, with a selected modulation scheme and if such combination is indicative of a priority level higher than a predetermined level, then the packet is allowed to be transmitted. This may be done by using an N×M matrix, where for each drop ranking level and for each modulation scheme there is an indication of pass or drop the CES packets.

A typical implementation of flow policer is made using an FPGA or using a Network Processor which may be a combination of hardware and software resources. The flow policer, may be configured by software using a suitable interface, for example a parallel or serial bus.

In a practical implementation, there may be a number of TDM flows associated to the lowest modulation scheme which are always guaranteed for transmission by the lowest available radio bandwidth. These flows may therefore have the lowest drop ranking (highest chance to be transmitted and not dropped), whereas TDM flows associated to higher modulation schemes have higher drop ranking levels and may therefore be transmitted only when a given modulation scheme, and a given radio bandwidth, as appropriate are available.

Therefore, the higher the drop ranking of the TDM flow is, the less the flow has a probability of being transmitted under channel degradation conditions. Thus when there is a degradation of radio channel and the ACM switches to a low modulation scheme only the CES packets related to TDM flows with a high drop ranking are discarded, leaving the CES packets related to low drop ranking TDM flows to be transmitted in the available radio bandwidth without generating errors at reception side.

The flow policer discards only the microflows which are not allowed to be transmitted since they have a drop ranking higher than the ranking required by the current modulation scheme. In this way, the degradation of radio channel is managed by discarding the packets with TDM flow which are considered of less value; and maintaining without impact of the degradation the TDM flows of higher value which are transmitted and delivered at the reception side without errors due to such degradation.

Figure 3:
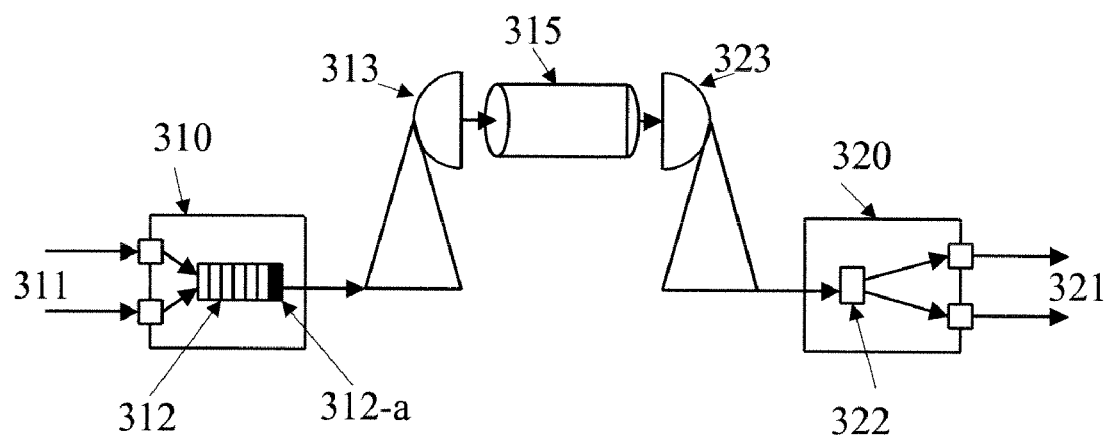
FIG. 3 is a schematic exemplary representation of a transmission scenario based on a high modulation scheme.

FIG. 3 schematically represents an initial transmission scenario where a microwave packet radio link with ACM uses a high modulation scheme in order to makes use of a broader radio bandwidth in a specific radio channel.

On the transmission side there is shown a microwave packet radio equipment 310 configured to implement CES over packet which receives TDM flows 311, for example E1 signals. The number of TDM flows carried by the link is determined by the radio bandwidth available in the High modulation scheme.

In order to guarantee delay and jitter constraints of TDM flows, these are assigned to a relatively high CoS using queue 312 which is scheduled with higher priority than other queues in the microwave packet radio link. Therefore, the packet 312-a may be transmitted thought the radio transmission interface 313 (e.g. an antenna) through air using a channel 315 of relatively broad bandwidth available with high modulation scheme.

At the reception side a radio reception interface 323 (e.g. an antenna) receives the traffic and feeds it into a microwave packet radio receiver equipment 320 where the signals are processed in known manners in appropriate units 322 and output 321 for further processing of the received signals.

Figure 4:
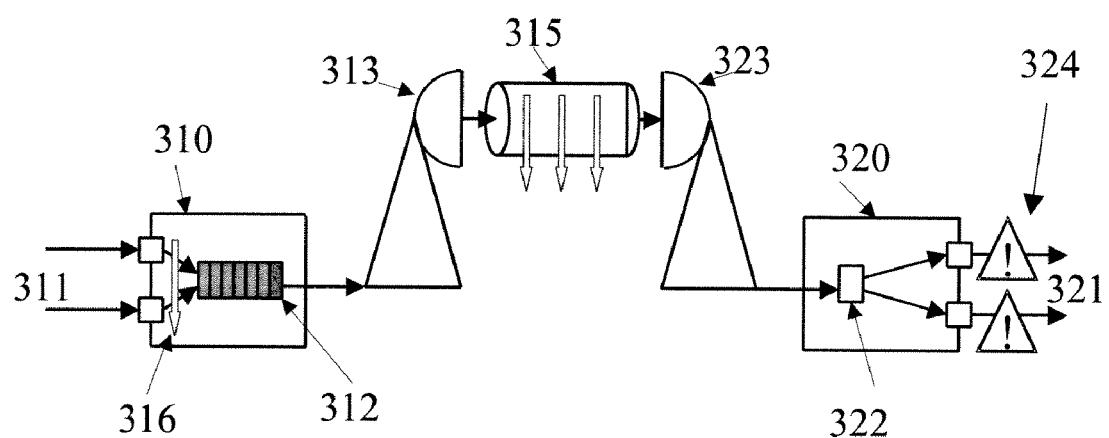
FIG. 4 is a schematic exemplary representation of a transmission scenario based on a low modulation scheme.

FIG. 4 schematically represents a faulty transmission scenario when a degradation of the radio channel occurs. As regards the element of this figure, it is to be noted that they are similar to those of FIG. 3 and therefore like elements in FIG. 4 have the like reference numerals as those of FIG. 3.

As a consequence of the degradation of the radio channel (e.g. fading or interference) the microwave packet radio link switches, using ACM, to a low modulation scheme in order to guarantee, as much as possible, an error-free radio link with a reduced radio bandwidth.

As already discussed in further detail above, the reduction of radio bandwidth gives rise to congestion at the transmission side, thus requiring CES traffic to be discarded which in turn affects randomly all TDM flows and causes the generation of error at the reception.

In FIG. 4, this situation is represented where the radio channel 351 suffers from degradation and therefore packets 316 are discarded in the microwave radio equipment 310 before transmission. Due to the effect of packet discarding, the TDM flows arriving at the reception side 320 generate error indications 324.

Figure 5:
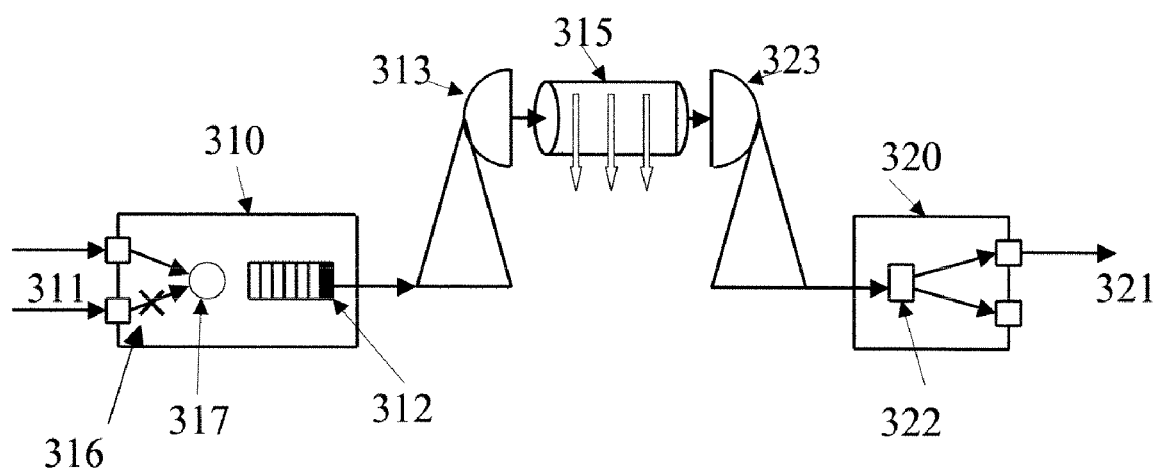
FIG. 5 is a schematic exemplary representation of a transmission scenario based on a low modulation scheme according to embodiments of the present invention.

FIG. 5, is a schematic representation of a transmission scenario based on a low modulation scheme according to embodiments of the present invention. In this figure also, like elements are marked with like reference numerals as those of FIG. 3 or 4.

As already discussed above, each TDM flow is assigned a drop ranking, related to the level of modulation scheme. For example the drop ranking is performed before the flow policer. The drop ranking assignment to a specific CES microflow may be specified in the dimensioning of the network and is configured on each equipment using either network management or a suitable control plane.

Furthermore, a flow policer 317 is used upstream the HP CoS queue 312. The flow policer 317 receives the CES packets classified with the drop ranking of the related TDM flow and an indication of the modulation scheme currently used. The Modulation scheme may be chosen by a modulator and communicated to the demodulator or viceversa. In any case, each side of the radio link knows the scheme of modulation which is currently used.

Based on the information received, the flow policer 317 discards only the microflows which are not allowed to be transmitted since they have a drop ranking higher than the level required by the current modulation scheme. This is schematically shown in the figure by reference numeral 316. In this manner, the CES packets having a low drop ranking are not discarded by the flow policer 317 and as a consequence the corresponding TDM flows transmitted at a low modulation scheme through the degraded radio channel 315 are not affected, thereby no error indication is generated at the reception side 320. The fact that only a part of the packets are transmitted (the other part being discarded at the transmission side) is symbolically represented in FIG. 5 by means of only one arrow 321, instead of two, at the output of the receiver equipment 320.

The transmitter and receiver equipment herein described may include blocks which can be hardware devices, software modules or combination of hardware devices and software modules This method can be advantageously implemented by using means like an Application Specific Integrated Circuit (ASIC), a Field Programmable Gate Array (FPGA) and/or a microprocessor, and in a preferred embodiment through or together with a software program like Very high speed integrated circuit Hardware Description Language (VHDL) or C programming language. Therefore, it is understood that the scope of the protection is extended to such a program or program product and in addition to a computer readable storage means having a message therein, such computer readable storage means contain program code means for the implementation of one or more steps of the method, when this program is run on a computer, an ASIC, an FPGA or a microprocessor.

The various embodiments of the present invention may be combined as long as such combination is compatible and/or complimentary.

Further it is to be noted that the list of structures corresponding to the claimed means is not exhaustive and that one skilled in the art understands that equivalent structures can be substituted for the recited structure without departing from the scope of the invention.

It is also to be noted that the order of the steps of the method of the invention as described and recited in the corresponding claims is not limited to the order as presented and described and may vary without departing from the scope of the invention.

The invention claimed is:

1. A method of radio transmitting packets, comprising the step of
    identifying packets corresponding to at least one respective transmission criterion, said transmission criterion being selected from either one or a combination of the following criteria:
        types of services classified in terms of reliability in transmission,
        bandwidth efficiency in transmission,
        drop ranking in transmission,
    assigning to the identified packet, an indicator indicative of said selected transmission criterion, the indicator assigned by marking the corresponding packet to show the selected transmission criterion,
    transmitting said packet according to the transmission criterion corresponding to the indicator assigned to the packet.

2. The method of claim 1, wherein the transmission is performed with a level of redundancy as identified by said indicator.

3. The method of claim 1 wherein the transmission is performed if the indicator in combination with a selected modulation scheme is indicative of a priority level higher than a predetermined level.

4. The method of claim 3 wherein the modulation scheme for transmitting packets is selected from a range of schemes comprising at least a high priority level scheme and a low priority level scheme.

5. The method of claim 1 wherein a predetermined weight of protection redundancy is applied as a function of the criterion identified for a service classified in terms of level of reliability or bandwidth efficiency for transmission of such service.

6. The method of claim 5, wherein a high protection redundancy is used for a service that needs a high level of reliability, and a light, or no protection redundancy is used for a bandwidth sensitive service, requiring low reliability.

7. The method of claim 1 wherein assigning an indicator to the identified packet is performed by marking one or more time slots of the packet indicative of the transmission criterion for the corresponding service.

8. The method of claim 7 wherein the identifier occupies a byte.

9. The method of claim 8 wherein the identifier byte may have one or more bits of information up to 8 bits of the byte with the same identifier information.

10. The method of claim 9 wherein an identifier having 8 bits of information may be interleaved bit by bit into 8 different bytes together with corresponding 7 bytes of payload timeslot of a previous timeslot.

11. The method of claim 1 wherein constant bit rate flows are transported over a microwave packet radio network using circuit emulation services and adaptive coding modulation and wherein a corresponding level of class of service (CoS) is provided to packets and wherein the identified packet is a TDM flow.

12. The method of claim 11 wherein the transmission of the TDM flows is controlled by means of a flow policer using information relative to a drop ranking indicator.

13. The method of claim 12 wherein the flow policer further uses a criterion based on the capacity available in the channel for controlling the transmission of the TDM flows.

14. The method of claim 12 wherein the flow policer is configured by an N×M matrix, where for a drop ranking level and for a modulation scheme there is an indication of pass or drop a CES packet.

15. The method of claim 14 wherein TDM flows having a drop ranking associated to a predetermined lower modulation scheme are transmitted and TDM flows having a drop ranking associated to a predetermined higher modulation scheme are dropped.

16. The method of claim 1, further comprising:
separating the identified packets by outputting packets for which higher reliability requirements were identified to a first processing module for applying higher redundancy to the corresponding packets and outputting packets for which higher bandwidth efficiency requirements were identified to a second processing module for applying lower redundancy to the corresponding packets.

17. A transmitter for radio transmitting packets, comprising
an identifier for identifying packets corresponding to at least one respective transmission criterion, said transmission criterion being selected from either one or a combination of the following criteria:
types of services classified in terms of reliability in transmission,
bandwidth efficiency in transmission,
drop ranking in transmission,
wherein the identifier is configured for assigning to the identified packet, an indicator indicative of said selected transmission criterion, the indicator assigned by marking the corresponding packet to show the selected transmission criterion, and
wherein the transmitter is configured for transmitting said packet according to the transmission criterion corresponding to the indicator assigned to the packet.

18. The transmitter of claim 17 being configured to perform transmission with a level of redundancy as indicated by said indicator.

19. The transmitter of claim 17 being configured to perform transmission if the indicator in combination with a selected modulation scheme is indicative of a priority level higher than a predetermined level.

20. The transmitter of claim 17 further comprising
a marker for marking one or more time slots of the packet indicative of the transmission criterion for the corresponding service.

21. The transmitter of claim 17 configured to transport constant bit rate flows over a microwave packet radio network using circuit emulation services and adaptive coding modulation wherein a corresponding level of class of service (CoS) is provided to packets and wherein the identified packet is a TDM flow.

22. The transmitter of claim 21 comprising a flow policer configured to control the TDM flow using information relative to a drop ranking indicator.

23. The transmitter of claim 22 wherein the flow policer is further adapted to use a criterion based on the capacity available in the channel for controlling the transmission of the TDM flows.

24. The transmitter of claim 22 wherein the flow policer is configured by an N×M matrix, where for a drop ranking level and for a modulation scheme there is an indication of pass or drop a CES packet.

25. The transmitter of claim 17 configured to transmit TDM flows having a drop ranking associated to a predetermined lower modulation scheme and to drop TDM flows having a drop ranking associated to a predetermined higher modulation scheme are dropped.

26. The transmitter of claim 17, further comprising:
a first processing module for applying higher redundancy to packets for which higher reliability requirements were identified by the identifier; and
a second processing module for applying lower redundancy to packets for which higher bandwidth efficiency requirements were identified by the identifier;
wherein the identifier is configured to separate the identified packets by outputting packets for which higher reliability requirements were identified to the first processing module and outputting packets for which higher bandwidth efficiency requirements were identified to the second processing module.

27. A non-transitory computer readable medium storing a computer program for performing the method of claim 1 when such program is run on a computer, an ASIC, an FPGA or a microprocessor.

28. Computer readable storage means containing program code means for the implementation of all the steps of the method of claim 1, when said program is run on a computer, an ASIC, an FPGA or a microprocessor.

* * * * *